Sept. 20, 1971  JEAN-PIERRE BERNARD  3,605,864
TURNTABLE SHELL MOULDING MACHINE WITH PIVOTALLY
INTERCONNECTED MOULD PARTS Filed Oct. 9, 1969  5 Sheets-Sheet 1

United States Patent Office 3,605,864
Patented Sept. 20, 1971

3,605,864
TURNTABLE SHELL MOULDING MACHINE WITH PIVOTALLY INTERCONNECTED MOULD PARTS
Jean-Pierre Bernard, 5 Avenue Valioud, Sainte-Foy les Lyon, Rhone, France
Filed Oct. 9, 1969, Ser. No. 865,092
Claims priority, application France, Oct. 10, 1968, 50,481
Int. Cl. B22c 13/08, 15/24
U.S. Cl. 164—166     5 Claims

ABSTRACT OF THE DISCLOSURE

The preparation of a mould assembly for moulding or casting purposes in which the mould assembly consists of two pivotally interconnected parts movable into closed abutting relationship for moulding or casting purposes from a position in which the mould parts are in longitudinal alignment in the same plane, in which position a pattern plate having an impression in relief is inserted into the cavities of the mould parts which are approximately the same configuration as the relief impression, a space of a few millimetres being left between the pattern and the mould parts and sand being blown in to said space through the mould parts to form a skin or shell for moulding purposes. The pattern plate is preferably heated.

---

This invention relates to a machine for the preparation of foundry sand shell moulds.

It is known to mould castings in removable-flask moulds. For this purpose agglomerated, silicious sand is used.

One of the main disadvantages of this known method is its cost. In fact, to form the desired removable-flask mould around the metallic pattern it is necessary to use a very substantial amount of sand, which necessitates an expensive installation.

An object of the present invention is to avoid this disadvantage by using an automatic machine for lowering the cost by reducing both the production times and the quantity of sand necessary for the preparation of each mould.

The method according to the invention for the preparation of a foundry mould around a metallic pattern which may be heated, consists in inserting the pattern in a heated, metallic mould part, the impression of which approximately conforms with the shape of the pattern in such a manner as to define a gap of several millimetres into which there is blown through an aperture in the mould part, a fluidised sand which gives rise on contact with the pattern (heated or not) to a solid shell adhering to the mould part.

The method according to the invention thus consists essentially in dressing a metallic mould part with a thin layer of sand which forms the shell. There is thus avoided the wastage inherent in the known method, namely using expensive sand for the entire body of the mould.

The invention also relates to a machine for carrying out the aforesaid method.

A mould preparing machine according to the present invention comprises a plurality of pairs of mould assemblies each of which comprises a first mould part on which is pivoted a second mould part which can be pivoted away from the first mould part, these two mould parts can be opened in aligned extension one of the other in the same plane in order that there can be applied to them both in a single operation, a heated pattern plate having one or more impressions in relief of the shape to be moulded, nozzles for blowing refractory dressing sand being provided for application to the perforated rear of the two mould parts in order to introduce sand into the gaps defined between the mould parts and the pattern plate.

Subsequently, it is sufficient to remove the pattern plate and to abut the two mould parts against each other after placing between them a core, in order to obtain a mould assembly ready for moulding.

According to a preferred embodiment of the invention, this machine is constructed in the form of a turntable grouping a large number of pairs of mould parts, one single pattern plate only being necessary. This gives an appreciable economy since the pattern plate is an expensive machined part while the shape of the impressions of the mould parts is very rough.

Referring to the drawings:

FIGS. 1, 2 and 3 illustrate a known method of moulding in removable-flask moulds and show its disadvantages.

An embodiment of the present invention will now be described, by way of example, with reference to the accompanying drawings, in which.

Figure 1:
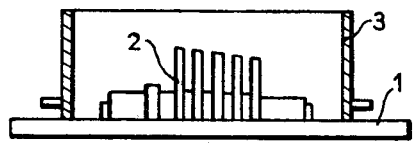
Figure 2:
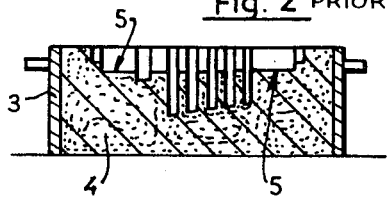
Figure 3:
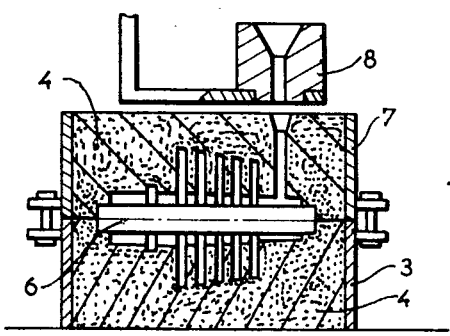

In order to illustrate the problem which the present invention obviates or mitigates there is shown in FIGS. 1, 2 and 3 a moulding operation according to a known method. For this, there is used a plate 1 integral with a metallic pattern 2 surrounded by a moulding box 3 open at both ends (FIG. 1) and resting on the plate 1. Sand 4 is introduced into the moulding box 3 to fill the same around the pattern 2 and is then tamped down by any known method, and the assembly is heated. The binding agent incorporated in the sand 4 (FIG. 2) causes on contact with the heated pattern 2, the formation of a skin or shell 5 which subsequently gives the impression created by the pattern 2 good mechanical strength during casting. The assembly is turned over and the plate 1 with its pattern 2 is withdrawn to provide a mould of the type illustrated in FIG. 2. A core 6 is now located in the opposed contiguous impressions of two similar half moulds, the upper half mould being formed of sand 3 tamped down in a moulding box 7 and the mould assembly is brought under a tundish 8 through which molten metal is poured into the mould assembly.

After stripping the cast product, the agglomerated sand 4 has to be treated before it can be used again.

It will be seen that this known method obliges the user to have at his disposal a sand-preparation plant. In addition, the operation is of long duration since it comprises moulding on pattern-plates 1, 2 (FIG. 1), reversing the moulding-boxes (FIG. 2), positioning the cores 6, and transfer of the mould assembly to a casting station. Such a casting station comprises an assembly area for the moulds for delivery to the casting zone, a cooling zone and a cleaning zone where the removal of the moulding boxes and the stripping of the moulded product is effected, as well as the recovery of sand which it is then necessary to cool and aglomerate once more in the sand-preparation plant.

It can be seen in FIG. 3 that the quantity of sand 4 to be used for each moulding is very substantial, often being equal to five or six times the weight of the parts to be cast.

Finally, the equipment necessary for carrying out this known method is very complex; it requires large capital investments; and necessitates handling of very substantial quantities of sand.

As a result of the present invention, the moulding operations are considerably simplified.

Figure 9:
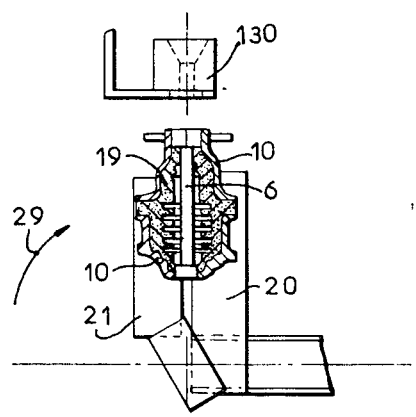
FIG. 9 is a sectional view showing the two mould parts closed against one another after a core has been placed between them.
Figure 10:
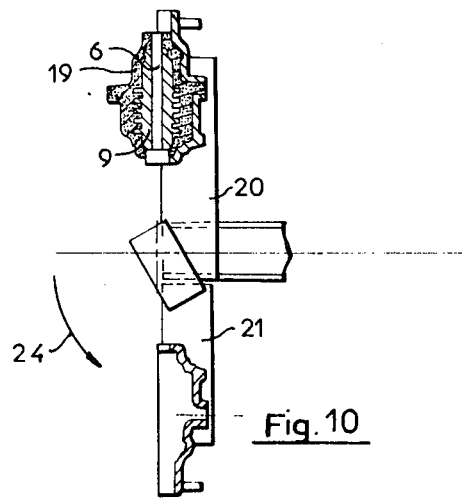
FIG. 10 shows the moulded part obtained after casting and after opening the mould assembly.
Figure 11:
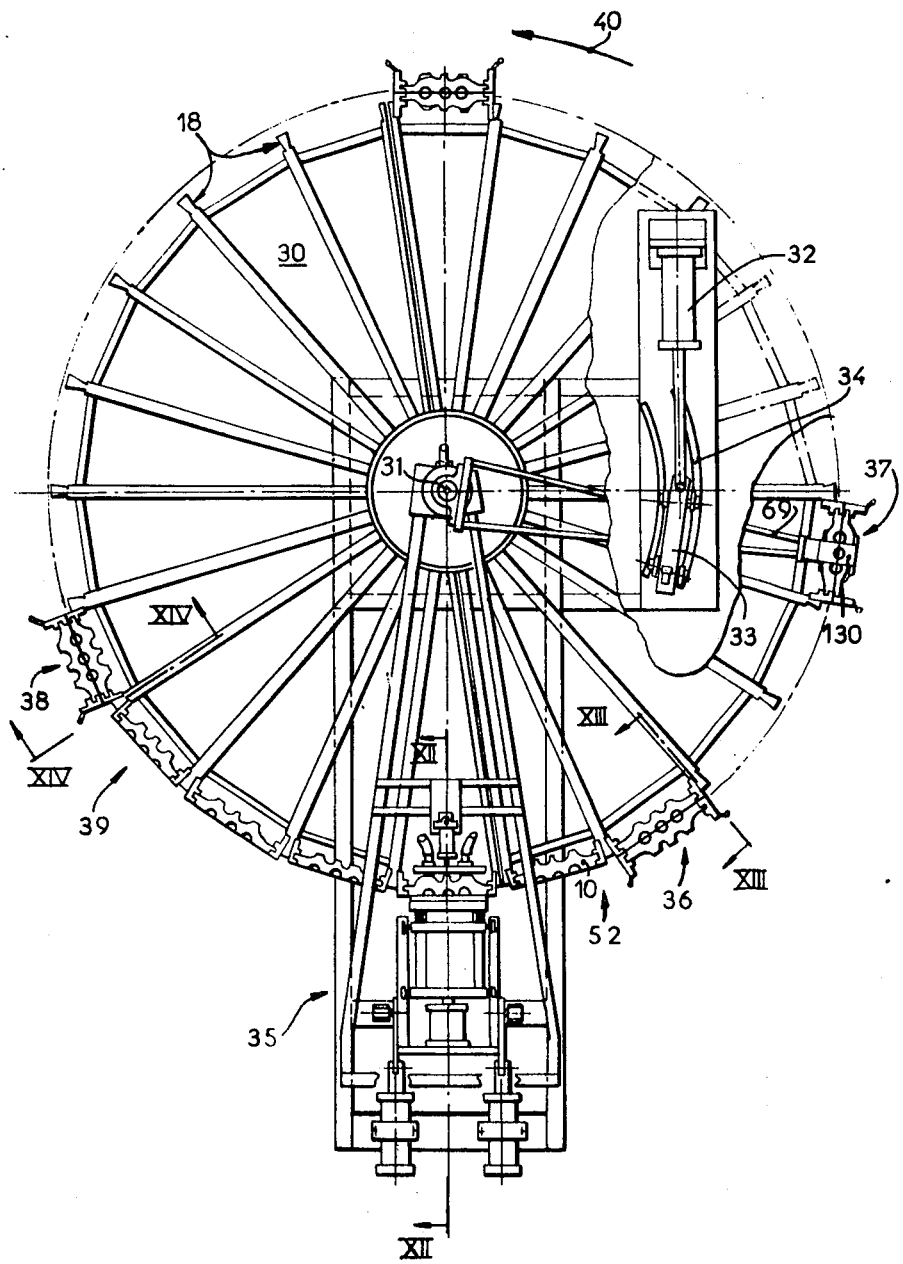
FIG. 11 is a plan view of an automatic turntable machine according to the invention.
Figure 12:
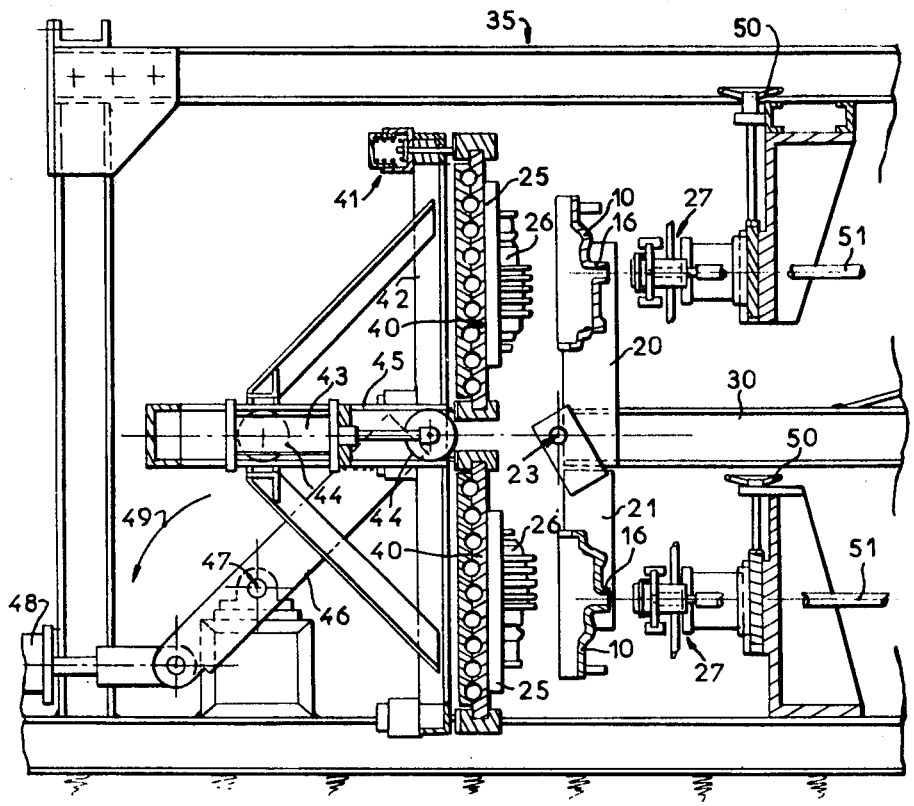
FIG. 12 is a section on the line XII—XII (FIG. 11) showing a detail of the unit for introducing the pattern plate.
Figure 13:
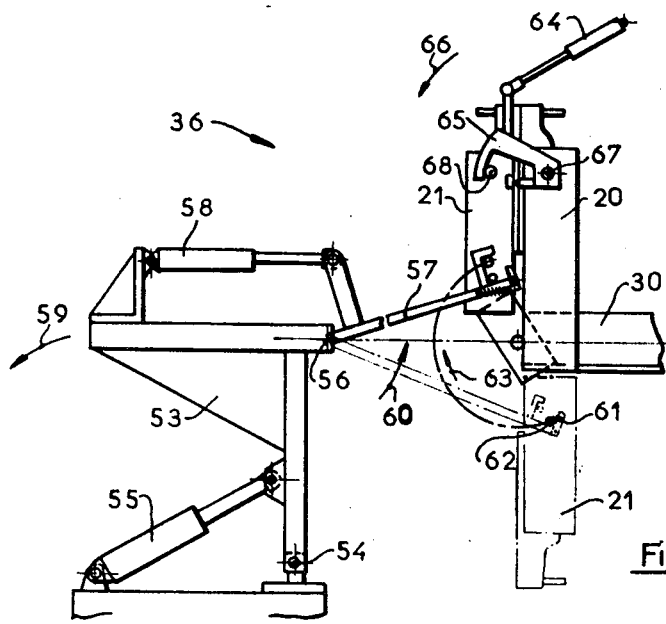
FIG. 13 is a section on the line XIII—XIII (FIG. 11) illustrating diagrammatically a detail of the unit for closing and locking the mould assemblies.
Figure 14:
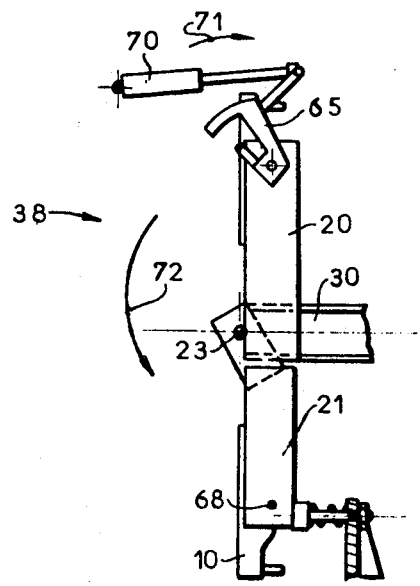
FIG. 14 is a section on the line XIV—XIV (FIG. 11) showing the unit for unlocking and opening the mould assemblies.

In the particular embodiment of FIGS. 4 to 14, it is assumed that this is for casting bladed cylinders for internal combustion engines or for air-compressors. These bladed cylinders necessitate a vertical molded joint. Such bladed cylinders are very complex and necessitate an excellent metallurgical quality. For producing these bladed cylinders there is adopted a system of casting with a shower gate for casting in a single operation a set of two cylinders or jackets 9 (FIG. 10).

Figure 4:
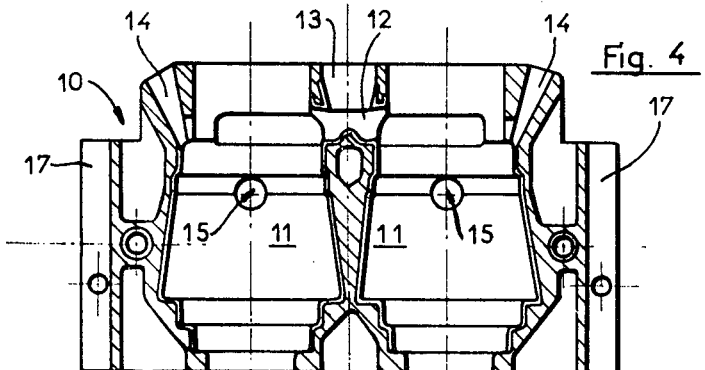
FIG. 4 is a front sectional view of a mould part used according to the invention for casting with a shower gate a group of adjacent parts.
Figure 5:
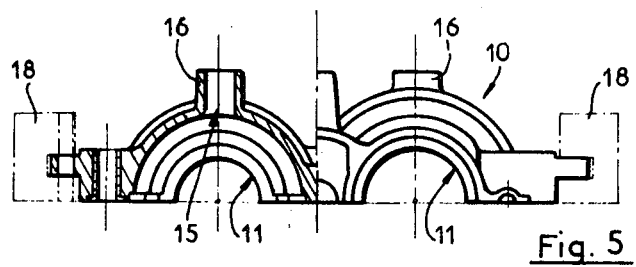
FIG. 5 is a corresponding sectional plan view.
Figure 6:
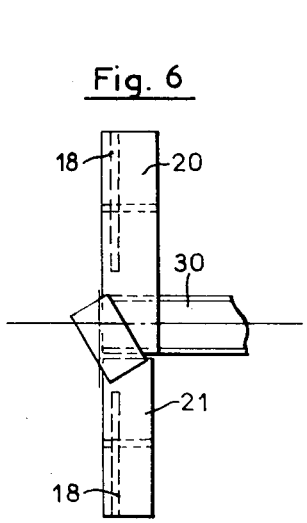
FIG. 6 shows two pivotally-interconnected supports in the open position, before they are equipped with mould parts.
Figure 7:
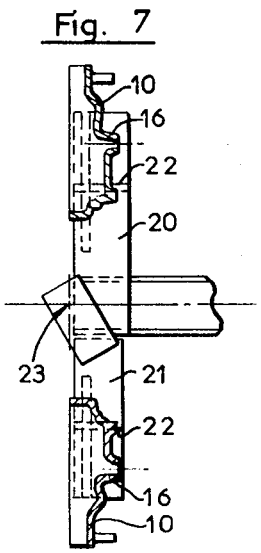
FIG. 7 is a view corresponding to the FIG. 6 after mounting the mould parts.
Figure 8:
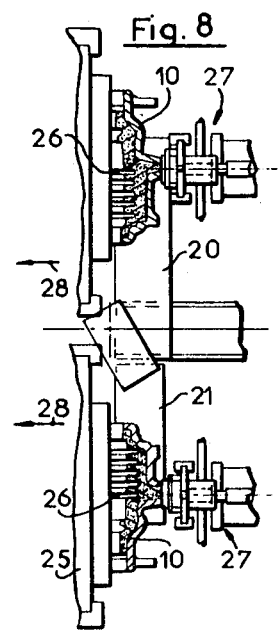
FIG. 8 is a view corresponding to FIG. 7 showing the pattern plate and nozzles for blowing the refractory dressing sand.

For casting such a set of two cylinders, there is employed mould parts as referred to in FIGS. 4 and 5 by the general reference 10. This mould part 10 defines two half-impressions 11 arranged side by side and communicating by means of a transverse channel 12. A central recess 13 communicating with the channel 12 serves as an inlet passage for the molten metal, and two air-vents 14 are provided adjacent each end of the mould part 10. A blow hole 15 communicating with each impression 11 extends through a projection 16 on the back of the mould part 10.

Each mould part 10 comprises two lateral guides 17 which permit it to be mounted between two positioning slides 18.

It will be noted that the shape of each impression 11 corresponds very approximately to the outer shape of the cylinder 9 which it is proposed to mould, play of several millimetres being provided for housing the refractory dressing 19 (FIGS. 9 and 10) between the part 9 and the base of the impression 11.

The method according to the invention consists in using two supports 20 and 21 (FIGS. 6 and 7) each provided with two slides 18. In the slides 18 of each support 20 and 21, there is engaged a mould part 10 (FIG. 7) which is locked in position by means of a spindle 22.

The support 21 is pivotal on the lower part of the support 20 about a pivot point 23. As this pivot point 23 is located slightly in front of the support 20 (see FIG. 7) it makes it possible, on the one hand, to pivot the support 21 and its mould part 10 upwardly against the support 20 and its mould part 10 (FIG. 9). On the other hand, it allows the pivotal support 21 (FIG. 10, arrow 24) to fall back under its own weight as soon as it is released after having been unlocked. In this balanced position, the support 21 is disposed below the support 20, in the same plane as the latter. This arrangement (FIG. 7) makes it possible to use for the two mould parts 10 (FIG. 8) a single plate 25 mounting two patterns 26.

By applying this plate 25 against the two mould parts 10 of the open supports 20 and 21 (FIG. 8) there is defined an assembly into which the refractory dressing sand is blown through the blow holes 15 by two jets 27 connected to the projections 16. The mould parts 10 and the patterns 26 of the plate 25 are then heated to form the shells or skins in the normal manner.

Then, the pattern plate 25 is removed in a single operation in the direction of the arrows 28 and the refractory dressing 19 remains in place in each mould part 10. A core 6 is located between the two mould parts 10, and the mould assembly is closed by pivoting the support 21 upwardly against the support 20 (arrow 29, FIG. 9). This mould assembly is then brought under a tundish 30 and the molten metal is poured in. After solidifying the mould assembly is opened (arrow 24, FIG. 10), then the mass defined by 6, 9, 19 is removed and the cylinders 9 are stripped.

It will be seen that for this entire moulding operation it is sufficient to use only a relatively thin layer of refractory dressing sand 19.

In addition, the performance of this method lends itself well to automated production as can be seen in FIGS. 11 to 14.

The machine illustrated in these figures comprises a turntable 30 rotatable about a shaft 31, and having on its periphery a number of pairs of vertical slides 18. In the example shown, these pairs of slides are twenty two in number, which facilitates the positioning of twenty two pairs of mould parts 10 in the same number of pivoted supports 20 and 21 of the type shown in FIGS. 6 to 10. The rotation of the turntable 30 about the shaft 31 is a stepwise one effected by means of a known mechanism which comprises a control jack 32 operating a carriage 33 with a ratchet, the latter being propelled by a reciprocating movement on an arcuate roller track 34.

Spaced around the circumference of the turntable is a blower unit 35 for dressing the moulds, a locking unit 36 for closing the mould assemblies, a casting unit 37, a release unit 38 for unlocking and opening the mould assemblies and finally a unit 39 for cleaning the mould parts 10. Between the casting unit 37 and the cleaning unit 38, the mould assemblies containing the cast parts have time to cool during the rotation of the turntable in the direction of arrow 40.

The unit for blowing the refractory dressing sand into the mould parts (FIGS. 11 and 12) comprises two plates 25 each with a pattern 26. In certain cases the two plates 25 can be unitary as disclosed in FIG. 8. The plates 25 are mounted on two thick plates 40 heated by gas or by electric elements. A resilient locating system with spring-loaded guides 41 makes it possible to ensure the centering of the pattern-plates 25, 26, relative to the mould parts 10 despite expansion differences due to heating. A frame 42 supporting the plates 40, the plates 25 and their patterns 26 is pushed against the mould parts 10 by a jack 43 and comprises four rollers 44 which allow a radial sliding movement along two rails 45 relative to the shaft 31 of the turntable 30. The rails 45 are integral with another frame 46 which can tilt about a horizontal shaft 47 under the action of a jack 48. When this jack 48 is extended, the frame 46 tilts in the direction of the arrow 49 which makes it possible to move the frame 42 horizontally.

The machine comprises blower nozzles 27 (FIGS. 8 and 12) provided for introducing the sand into the mould parts 10. The lining sand is preferably constituted by a mixture of extra silicious sand with a thermosetting resin such as phenol formaldehyde or an agglomerant which sets when cold. The former mixture is sometimes preferable for it is very fluid and makes it possible to obtain without difficulty complex reliefs without having to provide a good depth of refractory dressing. The nozzles 27 are water-cooled and adjustable in height each by means of a screw arrangement controlled by a wheel 50 which is controlled by hand. The nozzles 27 slide in a double slide, which is not shown, in the direction of the horizontal plane which makes it possible to adjust their positions with respect to the axis of the projections 16 defining the blow holes 15 in the mould parts 10.

These nozzles 27 are connected by means of flexible tubes 51 to a source of fluidised powdery lining material. The horizontal blowing into a mould with a vertical joint favours the escape of air during the blowing in of the refractory dressing. There is thus obtained a sand structure without defect.

After the blowing unit 35, the mould parts 10 arrive at a unit 52 (FIG. 11) where the cores are located in position.

At the unit 36 the mould assemblies are closed and locked. For this purpose there is used the mechanism illustrated in FIG. 13. This unit comprises a support 53, the radial movement of which in relation to the turntable 30 is controlled by rotation about a stationary shaft 54, under the action of a jack 55. This support 53 is itself provided with a pivot 56 on which pivot side by side two arms 57, only one of which is shown on the drawings. The pivoting of these arms 57 is controlled by a jack 58 with which the support 53 is provided.

During the rotation of the turntable 30, the mould parts arrive at the unit 36 with the supports 21 and 20 open in the same plane (position of the lower support 21 shown in dot-dash line). The locking of the turntable 30 in the desired angular position controls the withdrawal of the support 53 by rotation in the direction of the arrow 59 due to the contraction of the jack 55 and simultaneously the lifting movement of the arms 57 (arrow 60) by the contraction of the jack 58. The end hook 61 with which each arm 57 is provided engages a lateral pin 62 of the lower support 21, and the latter is thus raised in the direction of the arrow 63. As soon as the support 53 reaches its rear position a reversing mechanism (not shown) makes it possible to move it forwards in the direction opposite to arrow 59, until the two mould parts are disposed against one another (position shown in full lines on FIG. 13 for the supports 20 and 21). At this instant, a jack 64 extends and causes rotation of a locking cam 65 in the direction of arrow 66. This cam is pivoted on a shaft 67 of the stationary support 20, and it engages behind a pin 68 with which the rotating support 21 is provided thus locking the mould parts together to form a mould assembly.

At the casting unit 37 (FIG. 11) the mould assembly is disposed under a tundish 130 of known type carried by a stationary support 69. The metal is poured from a casting ladle or from a furnace provided with a lip. The metal flow may be controlled by electromagnetic control or by fluid pressure into a part of the basin constructed in the form of a siphon, with stoppage of the flow by a photoelectric cell which detects the rise of metal in the mould assemblies. A device of this type allows a completely automatic feed of the assembly.

The rotation of the turntable in the direction of arrow 40 then moves the mould assembly and the moulded cylinders to the stripping unit 38.

At this unit (FIG. 14) a jack 70 extends to cause rotation of the cam 65 in the direction of arrow 71. The support 21 is thus released and pivots downwardly due to its own weight as well as that of its mould part 10 about the pivot axis 23 (arrow 72).

When the mould assembly is open (FIG. 10) the moulded cylinders 9 are removed and then stripped. Then the rotation of the turntable 30 brings the mould parts to the unit 39 where they are cleaned. They are then ready to receive a new refractory dressing at the unit 35 in order to begin a new cycle.

It will be seen that the invention makes it possible to use a single set of pattern plates 25, 26 for twenty two or more sets of mould parts.

The foregoing description has only been given as an example, it would not be diverging from the scope of the claimed invention to replace the details of the embodiments described by other equivalent arrangements. In particular, it would not be diverging from the scope of the claimed invention to replace the turntable 30 rotating about the shaft 31, by an aerial conveyor system transporting the supports 20, 21 and their mould parts 10 over an endless path. Moreover, the pivot shaft of the two mould parts 20 and 21 may be replaced by a vertical axis provided the surfaces of the mould parts are disposed in contact on closing.

The cores used at the unit 52 can be of any known type. In particular cores with two plane faces can be used which cores are manufactured alongside the machine in the case of a moulding conceived according to a method which would correspond, in standard moulding, to the use of three moulding boxes. Finally, the method and the machine may be used for moulding parts of any shape.

What is claimed is:

1. A mould-preparing machine comprising an endless conveyor moulding path along which various mould preparation and moulding operations can be effected, a plurality of mould assemblies mounted for movement along said path and each comprising a pair of pivotally interconnected mould parts, position-stationary means for moving said mould parts between a first position in which the mould parts are in alignment in the same plane and a second position in which the mould parts are in interlocked face-to-face contact defining between them a mould chamber, position-stationary heatable pattern means configured to the article to be moulded disposed at one location along the moulding path and mounted for insertion in the mould parts with predetermined spacing when they are in the first position, and position-stationary nozzle means disposed also at said location and mounted to communicate with the spacing between the mould parts and pattern means to introduce into said spacing refractory dressing sand.

2. A mould-preparing machine according to claim 1, in which a rotatable turntable defines the endless conveyor moulding path, the moulding assemblies being mounted around the circumference of the turntable which other than the means for rotating same has no power source.

3. A mould-preparing machine according to claim 1, in which the nozzle means for blowing the refractory dressing sand into the mould parts are horizontally disposed so that the sand is introduced in the form of horizontal jets.

4. A mould-preparing machine according to claim 1, in which the mould parts are connected about a horizontal axis in vertical relationship so that, when unlocked, the lower mould pivots downwardly due to gravity to open the mould assembly.

5. A mould-preparing machine according to claim 2, in which the pattern means is supported by a first frame slidable radially relative to the turntable on a second frame pivoted about a horizontal shaft mounted at the position-stationary location outside the turntable, a jack being provided for pivoting the second frame about the horizontal shaft for bringing the pattern means both into the vertical position for moulding and the horizontal position for cleaning.

References Cited

UNITED STATES PATENTS

| 3,077,014 | 2/1963 | Jennings et al. | 164—22X |
| 3,104,431 | 9/1963 | Deve et al. | 164—166 |
| 3,508,598 | 4/1970 | York | 164—166X |

FOREIGN PATENTS 14,302  9/1962  Japan.

ROBERT D. BALDWIN, Primary Examiner

U.S. Cl. X.R.

164—201